US008578421B2

(12) United States Patent
White et al.

(10) Patent No.: US 8,578,421 B2
(45) Date of Patent: Nov. 5, 2013

(54) HEADEND MODELING OF DATA (75) Inventors: David White, Weymouth (GB); Ian Bastable, Fareham (GB); Martin Gold, Stockbridge (GB)

(73) Assignee: Cisco Technology Inc., San Jose, CA (US)

( * ) Notice: Subject to any disclaimer, the term of this patent is extended or adjusted under 35 U.S.C. 154(b) by 7 days.

(21) Appl. No.: 13/068,922

(22) Filed: May 24, 2011

(65) Prior Publication Data

US 2011/0231879 A1 Sep. 22, 2011

Related U.S. Application Data (62) Division of application No. 12/800,441, filed on May 14, 2010, which is a division of application No. 11/920,800, filed as application No. PCT/GB2006/002113 on Jun. 9, 2006, now abandoned.

(30) Foreign Application Priority Data

Jun. 9, 2005 (GB) .................................. 0511774.2

(51) Int. Cl.
*G06F 3/00* (2006.01)
*G06F 13/00* (2006.01)
*H04N 5/445* (2011.01)

(52) U.S. Cl.
USPC .................. 725/50; 725/39; 725/40; 725/46; 725/54; 709/231

(58) Field of Classification Search
None
See application file for complete search history.

(56) References Cited

U.S. PATENT DOCUMENTS 5,515,106 A  5/1996 Chaney et al.
5,841,433 A  11/1998 Chaney
(Continued)

FOREIGN PATENT DOCUMENTS

EP  1 158 790 A2  11/2001
JP  2000307968  11/2000
(Continued)

OTHER PUBLICATIONS

Nov. 5, 2008 Examination Report in connection with prosecution of EP 744 164.2.
(Continued)

*Primary Examiner* — Joshua Taylor
(74) *Attorney, Agent, or Firm* — Husch Blackwell LLP (57) ABSTRACT A data modeling method for modeling data for an electronic program guide (EPG) at a broadcast headend is described. The method includes grouping receiver types according to a first set of characteristics associated with a receiver type, thereby producing a plurality of groups of receivers, assigning a bit number to each group of receivers, providing EPG data, the EPG data including data for display at an EPG, the EPG data being included in a data fragment, evaluating the data fragment and the EPG data included therein according to at least one characteristic from a second set of characteristics, thereby producing a result, adding metadata to the data fragment, the metadata including a bit field including the assigned bit number, the bit number being determined in accordance with the result, the metadata being indicative of at least one characteristic from the first set of characteristics with which a data container and EPG data included therein are associated, and broadcasting the data fragment in the data container. Related methods and apparatus are also described.

12 Claims, 6 Drawing Sheets

KEY: <M> NUMBER OF CONTAINERS, <T> MINIMUM PERIOD BETWEEN UPDATES,
<K> NUMBER OF PERIODS COMPLETE DATA SET IS STATIC FOR

(56) References Cited

U.S. PATENT DOCUMENTS

| | | | |
|---|---|---|---|
| 5,844,620 | A | 12/1998 | Coleman et al. |
| 5,951,639 | A | 9/1999 | MacInnis |
| 6,005,562 | A | 12/1999 | Shiga et al. |
| 6,147,714 | A | 11/2000 | Terasawa et al. |
| 6,362,853 | B1 | 3/2002 | Ouchiyama et al. |
| 6,658,661 | B1 | 12/2003 | Arsenault et al. |
| 6,675,385 | B1 | 1/2004 | Wang |
| 6,718,374 | B1 | 4/2004 | Del Sordo et al. |
| 6,741,834 | B1 | 5/2004 | Godwin |
| 7,298,960 | B1 | 11/2007 | Taylor et al. |
| 7,434,245 | B1 | 10/2008 | Shiga et al. |
| 2002/0049968 | A1 | 4/2002 | Wilson et al. |
| 2003/0002598 | A1 | 1/2003 | Inose et al. |
| 2003/0074256 | A1* | 4/2003 | LaCroix ............................ 705/14 |
| 2003/0079036 | A1* | 4/2003 | Terada et al. ................ 709/231 |
| 2003/0120758 | A1 | 6/2003 | Yassin et al. |
| 2003/0131355 | A1 | 7/2003 | Berenson et al. |
| 2004/0123317 | A1 | 6/2004 | Ozawa |
| 2004/0141530 | A1 | 7/2004 | Spio |
| 2004/0148637 | A1 | 7/2004 | Sterkin et al. |
| 2004/0187150 | A1 | 9/2004 | Gonder et al. |
| 2004/0250289 | A1* | 12/2004 | Hirai et al. .................... 725/115 |
| 2005/0183116 | A1 | 8/2005 | Pietraszak et al. |
| 2005/0204385 | A1* | 9/2005 | Sull et al. ....................... 725/45 |
| 2006/0026302 | A1 | 2/2006 | Bennett et al. |
| 2006/0155766 | A1* | 7/2006 | Kim et al. ................. 707/104.1 |
| 2006/0253544 | A1 | 11/2006 | Luoma et al. |
| 2008/0092166 | A1 | 4/2008 | Bastable et al. |

FOREIGN PATENT DOCUMENTS

| | | |
|---|---|---|
| WO | WO 01/17250 A1 | 3/2001 |
| WO | WO 02/075596 A2 | 9/2002 |
| WO | WO 03/015394 A2 | 2/2003 |
| WO | WO 03/105470 A1 | 12/2003 |
| WO | WO 2004/008739 A1 | 1/2004 |
| WO | WO 2006/019819 A2 | 2/2006 |

OTHER PUBLICATIONS

Jul. 28, 2010 Office Action in connection with prosecution of U.S. Appl. No. 11/920,800.

Feb. 16, 2011 Office Action in connection with prosecution of U.S. Appl. No. 11/920,800.

May 2, 2011 Office Communication in connection with prosecution of EP 10 01 4601.8.

Paul V. Biron et al. (ed.); "XML Schema Part 2: Datatypes" (W3C, May 2, 2001); available on the worldwide web at http://www.w3.org/TR/2001/REC-xmlschema-2-20010502/.

James Clark et al. (ed.); "XML Path Language (XPath)" Version 1.0, (W3C, Nov. 16, 1999); available on the worldwide web at http://www.w3.org/TR/1999/REC-xpath-19991116.

Henry S. Thompson et al. (ed.); "XML Part 1: Structures" (W3C, May 2, 2001); available on the worldwide web at http://www.w3.org/TR/2001/REC-xmlschema-1-20010502/.

"Broadcast and On-line Services: Search, select, and rightful use of content on personal storage systems ("TV-Anytime Phase 1"); Part 3: Metadata; Sub-part 2: System aspects in a uni-directional environment" ETSI TS 102 822-3-2 V1.1.1 (European Telecommunications Standards Institute, Oct. 2003).

"Digital Broadcasting Systems for Television, Sound and Data Services; Allocation of Service Information (SI) codes for Digital Video Broadcasting (DVB) Systems" ETSI ETR 162 (European Telecommunications Standards Institute, Oct. 1995).

"Digital Video Broadcasting (DVB); Guidelines on Implementation and Usage of Service Information (SI)" ETSI ETR 211(European Telecommunications Standards Institute, Aug. 1997).

"Digital Video Broadcasting (DVB); Specification for Service Information (SI) in DVB Systems" ETSI EN 300 468 V1.4.1 (European Telecommunications Standards Institute, Nov. 2000).

Jul. 12, 2011 Office Communication in connection with prosecution of EP 06 744 164.2.

Apr. 3, 2012 Office Action in connection with prosecution of U.S. Appl. No. 12/800,441.

Jul. 18, 2012 Office Action in connection with prosecution of U.S. Appl. No. 12/800,441.

* cited by examiner

HEADEND MODELING OF DATA

RELATED APPLICATION INFORMATION

The present application is a divisional of U.S. Ser. No. 12/800,441, which was filed 14 May 2010 and published on 16 Sep. 2010 with publication number US 2010/0235860 A1; which is a divisional of U.S. Ser. No. 11/920,800, which has a 371(c) date of 22 Jan. 2008 and was published on 21 May 2009 with publication number US 2009/0133074 A1; which is a 35 USC §371 application of PCT/GB2006/002113, which was filed on 9 Jun. 2006, was entitled "Headend Modeling of Data", and was published in the English language on 14 Dec. 2006 with International Publication Number WO 2006/131748 A2; and which claims the benefit of priority based on UK Patent Application GB 0511774.2 of NDS Limited, filed 9 Jun. 2005, and titled, "EXTENDED SERVICE INFORMATION 2 (XSI-2)". The disclosures of PCT/GB2006/002113 and UK Patent Application GB 0511774.2 are incorporated herein by reference.

FIELD OF THE INVENTION

The present invention, in preferred embodiment thereof, relates to methods for conveying program guide information from a broadcast headend to a set top box.

BACKGROUND OF THE INVENTION

PCT application PCT/IL02/00190 of NDS Ltd., published in the English language as WO 02/075596 on 26 Sep. 2002, and corresponding U.S. patent application Ser. No. 10/469,487 of Sterkin et al., published on 29 Jul. 2004 as US 2004/0148637, describes a method for accessing at least one literal data item in a hierarchical structure, the method including receiving a request to access at least one literal data item, and accessing the at least one literal data item, at least in part, by choosing and using an access method chosen from the following group: local storage access, back channel access, and data carousel access. The disclosures of WO 02/075596 and corresponding US 2004/0148637 are hereby incorporated herein by reference.

PCT application PCT/US00/23868 of Ismail et al., published in the English language as WO 01/17250, describes a system residing preferably in a television set-top box, wherein the system monitors the television watching habits of one or more viewers and creates one or more profiles for each viewers descriptive of various characteristics of each viewers, including television watching preferences and demographics. The set-top box is able to select among various available video programming segments to create customized and/or targeted video programs for delivery to the viewer of viewers as a linear program. The customized linear video programs may include targeted content, advertising, and other video programming.

PCT application PCT/US2005/024854 of SBC Knowledge Ventures L.P., published in the English language as WO 2006/019819, describes a method of pre-caching video content is provided and includes measuring an available bandwidth of a data connection to a set top box. The available bandwidth measurement can be an average available bandwidth of the data connection to the set top box or a minimum available bandwidth of the data connection to the set top box. Each of a plurality of video files is divided into a first portion and a second portion and the size of each first portion is based on the available bandwidth measurement. The first portion of each of the plurality of video files is downloaded over the data connection and stored in a memory within the set top box. A list is displayed at a display device and includes a list of video titles that correspond to the plurality of video files that have only a first portion downloaded to the memory.

U.S. patent application Ser. No. 09/877,718 of Wilson et al., published in the English language as US 2002/0049968, describes a method and apparatus for delivering targeted assets to subscribers using communication media, wherein each subscriber has a set top box, the method comprising the steps of generating a profile of each subscriber at the set top box associated with the respective subscriber, broadcasting an asset to all subscribers along with target information; and delivering the asset only to subscribers whose profiles match the target information. The delivery of the asset, and accumulated information from delivery of the asset to other subscribers, is reported to a user using an asset delivery notification, without identifying the subscriber to the user. A privacy manager is used to strip identification information from the asset delivery notification. The profile, which may include real time information, for example on whether the subscriber set is on and what it is tuned to, is generated by monitoring the viewing habits of the subscriber and storing the information at a set top box.

U.S. patent application Ser. No. 11/247,739 of Bennett et al., published in the English language as US 2006/0026302, describes a media server component operative to serve media programs to a plurality of client media players across a distribution network taking into consideration available data transfer rate and media player characteristics. The media programs are served adaptively, considering screen size, refresh rate required, frame rate, audio format, user preferences at the recipient media player's end (such as region of interest adaptation, resizing of the windows, or desired quality of display) and estimated available data transfer rate. The media server component responds to the channel conditions (such as available data transfer rate), recipient media audio and video characteristics and the user preferences at the recipient device's end in real time, by either delivering a stored program or transcoding the stored program in real time. The media server components, when incorporated into many different media players that process video signals, deliver media programs adaptively to the client devices. The media server component in the set top box allows multiple users to receive media programs or television broadcasts adaptively meeting the player display characteristics of the recipient devices of the users.

U.S. Pat. No. 6,362,853 to Ouchiyama et al., describes a method and device for picture display capable of performing suitable picture display corresponding to various video signals. Kind of an input video signal is determined based on prestored characteristic information on video signals, and the input video signal is displayed in a picture according to the characteristic information based on the above determined result, so that a suitable displayed picture can be obtained corresponding to the input video signal.

U.S. Pat. No. 5,951,639 to MacInnis, describes a system for downloading different versions of software or data modules into a plurality of terminals having different compatibility interfaces includes an authoring component for generating the different module versions, a downloading source including a descriptor table which associates each module version with a list of compatibility requirements needed to download the module, and a plurality of terminals coupled to the downloading source. The downloading source transmits the descriptor table to each terminal and also continuously transmits the modules over the network. Each terminal extracts the descriptor table and, based on a match between an entry in the descriptor table and an internally stored table determines which version of a particular module should be downloaded. The system avoids the need for two-way communication between each terminal and the downloading source.

U.S. Pat. No. 6,718,374 to Del Sordo et al., describes a method and system to identify programming code that is appropriate to the architecture and capabilities of a set-top terminal in a cable television system. The appropriate programming code is identified from among a variety of code objects being broadcast from the headend facility of the cable television system. A platform identifier stored in the set-top terminal is matched to a corresponding platform identifier in an entitlement management message or other download locator message that specifies where in the transport stream from the headend a particular code object can be acquired. By acquiring the object corresponding to the message bearing a matching platform identifier, the set-top terminal acquires programming code compatible with its attributes. Additionally, the cable television system can then optimally support a varied population of set-top terminals Standards that are relevant to understanding the state of the art include the following published standards:

ETS 300 468, *Digital Video Broadcasting (DVB) Specification for Service Information (SI) in DVB Systems;*

ETR 162, *Digital broadcasting systems for television, sound and data services; Allocation of Service Information (SI) codes for Digital Video Broadcasting (DVB) systems;*

ETR 211, *Digital Video Broadcasting (DVB); Guidelines on Implementation and Usage of Service Information (SI);*

XML Schema Part 1: Structure, www.w3.org/TR/2001/REC-xmlschema-1-20010502/;

XML Schema Part 2: Datatypes, www.w3.org/TR/2001/REC-xmlschema-2-20010502/; and

XML Path Language (XPath) Version 1.0, www.w3.org/TR/1999/REC-xpath-19991116.

The disclosures of all references mentioned above and throughout the present specification, as well as the disclosures of all references mentioned in those references, are hereby incorporated herein by reference.

SUMMARY OF THE INVENTION

The present invention seeks to provide an improved method of delivery of data, preferably electronic program guide (EPG) data, to receivers. Packets of data are tagged for particular types of receivers. Thus, packet A might be relevant for three receiver types, and packet B might be relevant for only one receiver type. EPG data for items further in the future are sent to fewer receivers. Receivers having larger caches/disk sizes are sent more info. For example and without limiting the generality of the foregoing, receivers having larger caches/disk sizes may preferably receive information enabling such receivers to display richer descriptions of upcoming programs. Alternatively, some receivers may comprise receivers appropriate for standard definition television, while other receivers comprise receivers appropriate for high definition television.

There is thus provided in accordance with a preferred embodiment of the present invention a data modeling method for modeling data for an electronic program guide (EPG) at a broadcast headend, the method including grouping receiver types according to a first set of characteristics associated with a receiver type, thereby producing a plurality of groups of receivers, assigning a bit-number to each group of receivers, providing EPG data, the EPG data including data for display at an EPG, the EPG data being included in a data fragment, evaluating the data fragment and the EPG data included therein according to at least one characteristic from a second set of characteristics, thereby producing a result, adding metadata to the data fragment, the metadata including a bit field including the assigned bit number, the bit number being determined in accordance with the result, the metadata being indicative of at least one characteristic from the first set of characteristics with which a data container and EPG data included therein are associated, and broadcasting the data fragment in the data container.

Further in accordance with a preferred embodiment of the present invention the first set of characteristics includes at least one of the following receiver characteristics receiver hard drive size, a receiver cache size, the receiver being high definition television enabled, and whether the receiver includes a hard drive.

Still further in accordance with a preferred embodiment of the present invention the second set of characteristics includes at least one of the following characteristics a time when program material associated with the EPG data is scheduled to be broadcast, the receiver hard drive size, the receiver cache size, the receiver being high definition television enabled, and whether the receiver includes a hard drive.

Additionally in accordance with a preferred embodiment of the present invention the receiver includes a set top box (STB).

Moreover in accordance with a preferred embodiment of the present invention the receiver includes a personal video recorder (PVR).

Further in accordance with a preferred embodiment of the present invention the receiver includes an integrated digital television (IDTV).

Still further in accordance with a preferred embodiment of the present invention the bit number includes a bitmap bit-value.

There is also provided in accordance with another preferred embodiment of the present invention a data update method for program guide data, the method including broadcasting a number of data containers, the number denoted M, each data container including at least a partial update to previously broadcasted program guide data, throughout a time-window of a fixed duration, denoted T, and utilizing each data container to broadcast every M-th at least a partial update after an initial use of the data container, thereby creating a cycle of update containers, wherein broadcasting the cycle of update containers continues until there are no further updates occurring within the time-window T, at which time broadcasting the cycle of update containers is paused.

Further in accordance with a preferred embodiment of the present invention each data container includes a version number.

Still further in accordance with a preferred embodiment of the present invention version number includes a version number of an EPG dataset.

Additionally in accordance with a preferred embodiment of the present invention and wherein the number of data containers, M, includes a fixed number of data containers.

Moreover in accordance with a preferred embodiment of the present invention the number of data containers, M, includes a variable number of data containers.

Further in accordance with a preferred embodiment of the present invention a plurality of data containers include a complete update to previously broadcasted program guide data.

Still further in accordance with a preferred embodiment of the present invention receivers receiving the data containers sequentially apply the at least partial updates included in the data containers.

Additionally in accordance with a preferred embodiment of the present invention the M data containers continue to be broadcast when the cycle of updates is paused.

There is also provided in accordance with still another preferred embodiment of the present invention a data update method for program guide data, the method including broadcasting a number of data containers, the number denoted M, each data container including at least a partial update to previously broadcasted program guide data, during a time-window of a fixed duration, denoted T, wherein the broadcast of data containers continues until there are no further updates occurring within time-window T, at which time the broadcast of data containers is paused.

Further in accordance with a preferred embodiment of the present invention each data container includes a version number.

Still further in accordance with a preferred embodiment of the present invention the version number includes a version number of an EPG dataset.

Additionally in accordance with a preferred embodiment of the present invention the number of data containers, M, includes a fixed number.

Moreover in accordance with a preferred embodiment of the present invention and wherein the number of data containers, M, includes a variable number.

Further in accordance with a preferred embodiment of the present invention a plurality of data containers include a complete update to previously broadcasted program guide data.

Still further in accordance with a preferred embodiment of the present invention a life-span of the complete update exceeds a period between broadcast of a first complete update and broadcast of a second complete update.

Additionally in accordance with a preferred embodiment of the present invention receivers receiving the data containers sequentially apply the at least partial updates included in the data containers.

There is also provided in accordance with still another preferred embodiment of the present invention a method of updating electronic program guide (EPG) data, the method including applying a version number to an EPG data set, incrementing the version number with each EPG data set update, broadcasting only a subset of EPG data set updates on a main EPG data transponder, and broadcasting all EPG data set updates as part of a trickle update stream.

There is also provided in accordance with still another preferred embodiment of the present invention a method for updating an electronic program guide (EPG) data set at a receiver, the method including receiving an EPG data set, the EPG data set being broadcast from a main EPG transponder, extracting an EPG data set version number from the received EPG data set, storing the extracted EPG data set version number, storing the EPG data set, downloading an EPG data set update including a sequentially next highest EPG data set version number, updating the stored EPG data set according to the downloaded EPG data set update, and storing the sequentially next highest EPG data set version number.

There is also provided in accordance with still another preferred embodiment of the present invention a data modeling system for modeling data for an electronic program guide (EPG) at a broadcast headend, the system including a receiver type grouping unit, operative to group receiver types according to a first set of characteristics associated with each receiver type, thereby producing a plurality of groups of receivers, an assigner operative to assign a bit-number to each group of receivers, an EPG data provider which provides EPG data, the EPG data including data for display at an EPG, the EPG data being included in a data fragment, an evaluator which evaluates the data fragment and the EPG data included therein according to at least one characteristic from a second set of characteristics, thereby producing a result, a metadata adding unit operative to add metadata to the data fragment, the metadata including a bit field including the assigned bit number, the bit number being determined in accordance with the result, the metadata being indicative of at least one characteristic from the first set of characteristics with which the data container and EPG data included therein are associated, and a broadcast system operative to broadcast the data fragment in the data container.

There is also provided in accordance with still another preferred embodiment of the present invention a data update system for program guide data, the system including a broadcast unit operative to broadcast a number of data containers, the number denoted M, each data container including at least a partial update to previously broadcasted program guide data, during a time-window of a fixed duration, denoted T, and the broadcast unit being operative to utilize each data container to broadcast every M-th at least a partial update after an initial use of the data container, thereby creating a cycle of update containers, wherein broadcasting the cycle of update containers continues until there are no further updates occurring within the time-window T, at which time the broadcasting of the cycle of updates is paused.

There is also provided in accordance with still another preferred embodiment of the present invention a data update system for program guide data, the system including a broadcast unit which broadcasts a number of data containers, the number denoted M, each data container including at least a partial update to previously broadcasted program guide data, during a time-window of a fixed duration, denoted T, wherein the broadcast of the data containers continues until there are no further updates occurring within the time-window T, at which time the broadcast of the data containers is paused.

There is also provided in accordance with still another preferred embodiment of the present invention a system for updating electronic program guide (EPG) data, the system including an EPG data set version number mechanism which applies a version number to an EPG data set, an incrementer which increments the version number with each EPG data set update, and a broadcast unit operative to perform at least one of the following broadcast only a subset of EPG data set updates on a main EPG data transponder, and broadcast all EPG data set updates as part of a trickle update stream.

There is also provided in accordance with still another preferred embodiment of the present invention a system for updating an electronic program guide data set at a receiver, the system including a receiver operative to receive a broadcast EPG data set, the broadcast EPG data set being broadcast from a main EPG transponder, an extractor operative to extract an EPG data set version number from the received broadcast EPG data set, a storage unit which stores the extracted EPG data set version number, a second storage unit which stores the received broadcast EPG data set, a downloader which downloads an EPG data set update including a sequentially next highest EPG data set version number, an updater which updates the received broadcast EPG data set stored in the storage unit according to the downloaded EPG data set update, and a data updater which stores the sequentially next highest EPG data set version number.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
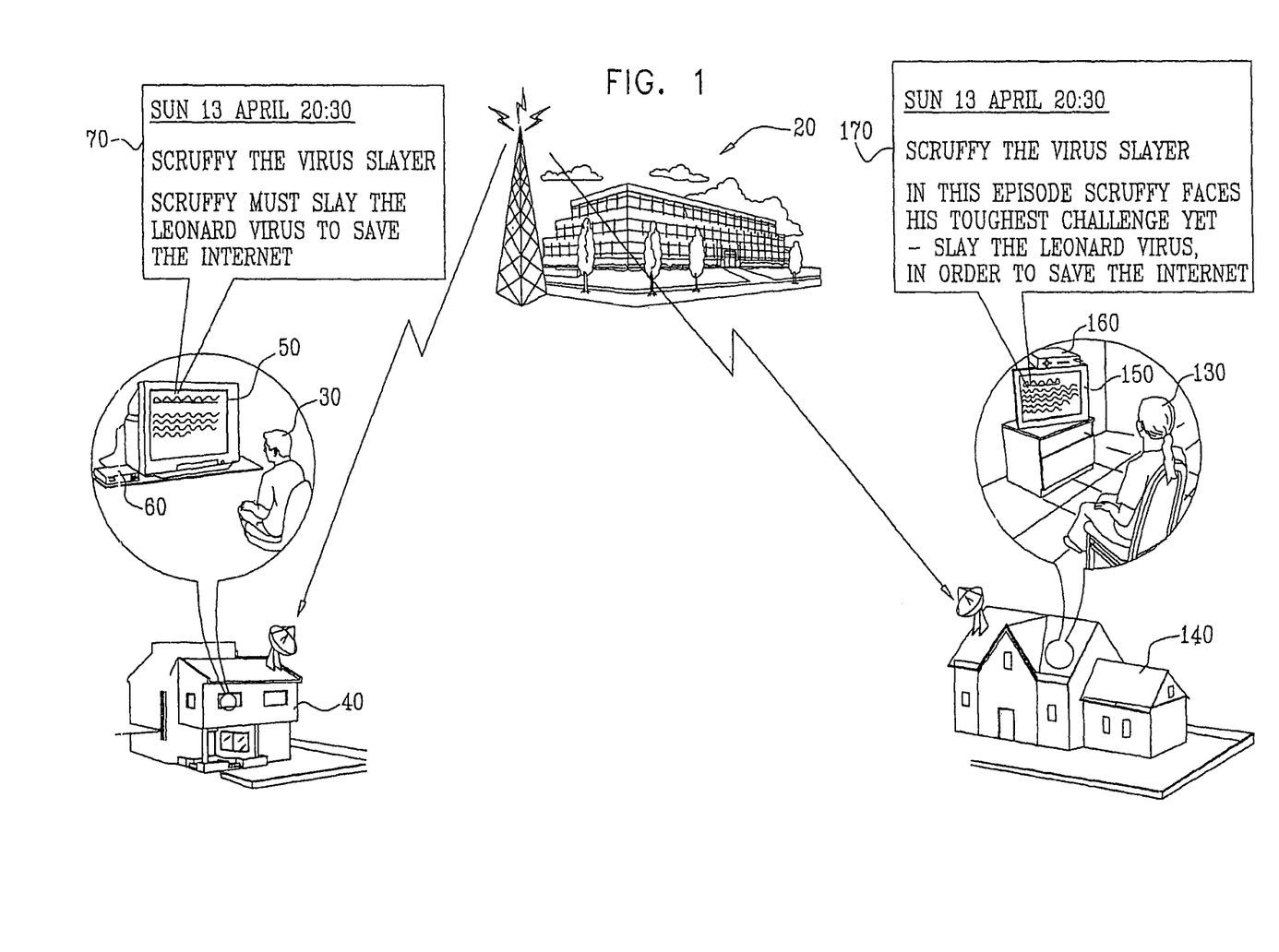
FIG. 1 is a simplified pictorial illustration of a system in which data modeling by a headend is implemented, constructed and operative in accordance with a preferred embodiment of the present invention.

Reference is now made to FIG. 1, which is a simplified pictorial illustration of a system in which data modeling by a headend is implemented, constructed and operative in accordance with a preferred embodiment of the present invention. The system of FIG. 1 comprises a system for preparation of data for an electronic program guide (EPG), the system for preparation of data being comprised in a television broadcast center 20. The system for preparation of data for the EPG is described below, with reference to FIGS. 2-4. In addition, the television broadcast center 20 comprises standard broadcast hardware and software, as is well known in the art.

FIG. 1 depicts a first viewer 30 viewing television in a first location 40 on a first television 50 receiving television signals from a first receiver 60. The first receiver 60 is operative to receive television data and metadata signals from the television broadcast center 20. A second viewer 130 is also viewing television in a second location 140 on a second television 150 receiving television signals from a second receiver 160. The second receiver 160 is operative to receive television data and metadata signals from the television broadcast center.

The term "receiver," in all of its grammatical forms, as used herein in the present disclosure and claims is understood to refer to any of set top boxes (STB), integrated digital televisions (IDTV), personal video recorders (PVR), and digital video recorders (DVR), as are well known in the art. All of the terms, receiver, STB, PVR, and DVR are used interchangeably herein.

The first receiver 60 and the second receiver 160 comprise a different set of characteristics. For example and without limiting the generality of the foregoing, a particular receiver may have:

a large cache size or a small cache size; and no internal hard drive, a small internal hard drive, or a large internal hard drive. (It is appreciated that the terms "large" and "small" are relative terms, and are only intended to be used as comparatives between the first and the second receiver.)

In the scene depicted in FIG. 1, the EPG legend 70 appearing on the first television 50 is different from the EPG legend 170 appearing on the second television 150. The difference in between the EPG legend 70 appearing on the first television 50 and the EPG legend 170 appearing on the second television 150 is preferably a result of each of the first receiver 60 and the second receiver 160 receiving a different set of EPG data. The determination of which set of EPG data each of the first receiver 60 and the second receiver 160 receives is preferably based on characteristics inherent in each receiver 60, 160.

The operation of the system of FIG. 1 is now explained with reference to FIGS. 2-4.

Figure 2:
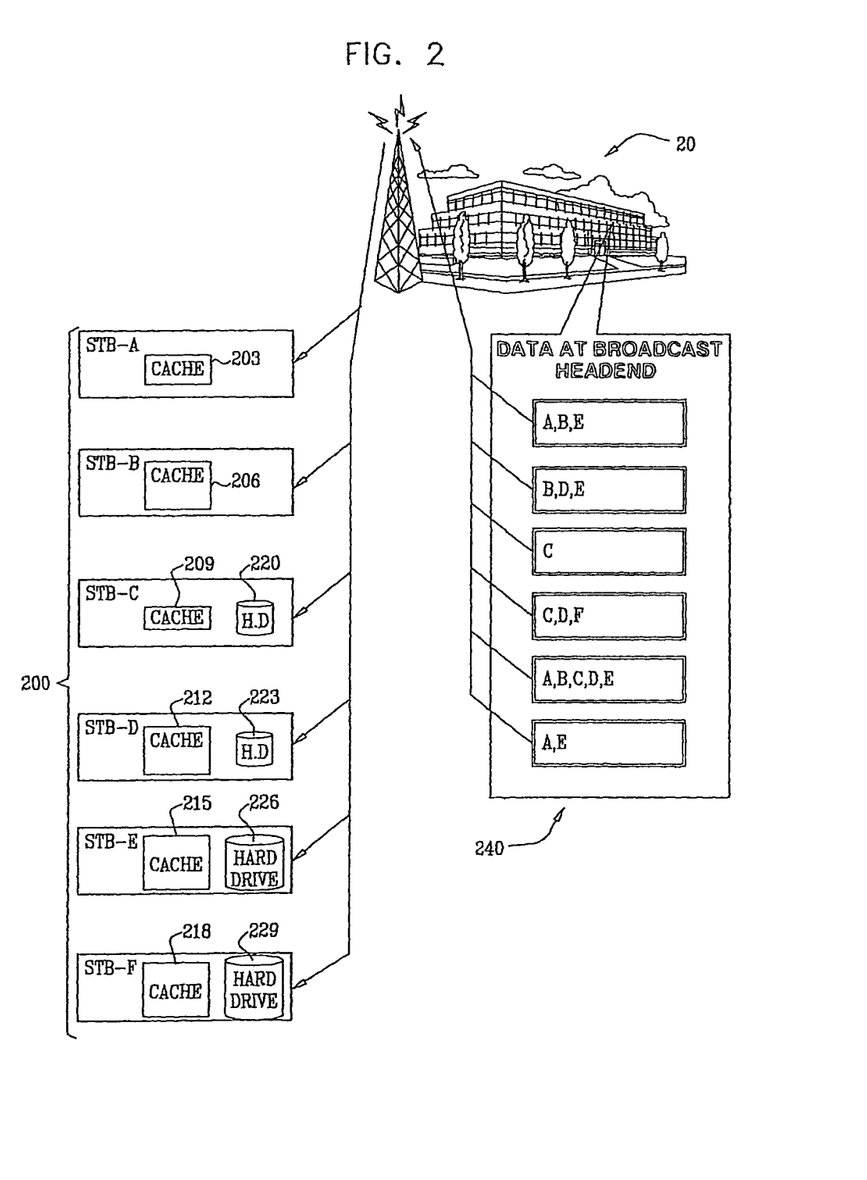
FIG. 2 is a simplified block diagram illustration depicting different units of data at a broadcast headend, different types of receivers, and a relationship between the different units of data and the different types of receivers within the system of FIG. 1.

Reference is now made to FIG. 2, which is a simplified block diagram illustration depicting different units of data at a broadcast headend located at the broadcast center 20, different types of receivers 200, and a relationship between the different units of data and the different types of receivers within the system of FIG. 1. Each of the different types of receivers 200 is depicted as comprising a cache 203, 206, 209, 212, 215, 218, the cache depicted as either a small cache 203, 209, 215, or a large cache 206, 212, 218. As is well known in the art, receivers typically comprise two different types of cache:

persistent cache—a cache that retains metadata after the receiver has left a metadata providing service; and performance cache—a cache that only holds metadata while the receiver is tuned (or otherwise connected) to the metadata providing service. Performance cache preferably decreases access time to the metadata stored therein. Typically, higher capability receivers utilize a large performance cache, thereby improving receiver performance.

Metadata is typically broadcast, in a periodic fashion, by the broadcast headend 20 as data carousels. Delivery of metadata in carousels preferably enables receivers to retrieve the metadata when the metadata is required for immediate use. As opposed to carousel delivery, the metadata is also delivered in an alternative fashion, trickle delivery. Trickle delivery preferably comprises delivery of metadata in a carousel with a long cycle time. Trickle delivery typically is used either to maintain a dataset which has previously been downloaded, or, alternatively, to deliver data over a long period. Metadata which is trickle delivered typically cannot be retrieved for immediate use.

Some satellite broadcast systems utilize different transponders: a dedicated transponder for EPG data and at least one transponder for non-EPG data, such as audio-visual data. Typically, trickle delivery of data is performed over the at least one transponder for non-EPG data. Carousel delivery of data is typically performed over the EPG transponder.

As depicted in FIG. 2, different receivers have different functionality (depicted in FIG. 2 as different cache sizes and different hard drive sizes, additionally and/or alternatively, different functionality may comprise receivers for standard definition television and high definition television (not depicted in FIG. 2)), and therefore, it is preferable that different types of metadata are broadcast from the broadcast headend, preferably such that each one of the different types of metadata is appropriate for at least one of the different types of receivers.

It is appreciated that different receivers may have different sizes of persistent cache. Therefore, it is preferable that different sizes of metadata be sent to the different receivers.

Receivers preferably maintain cached data by accessing trickle delivery. Trickle delivery typically entails downloading data and caching the downloaded data in the persistent cache. It is appreciated that a receiver comprising a larger persistent cache typically functions more efficiently than a receiver with a smaller persistent cache.

An EPG application running in the receiver preferably is able to detect which types of data should be acquired, at least based on a receiver profile available to the EPG application. In some preferred embodiments of the present invention, as described below, the broadcast headend preferably labels the metadata as relevant for a given receiver profile.

Returning to the discussion of FIG. 2, different receivers 200 are depicted as comprising different size caches 203, 206, 209, 212, 215, 218, and comprising either no hard drive (STB_A, STB_B) or comprising different size hard drives 220, 223, 226, 229. Alternatively and/or additionally (although not depicted in FIG. 2), some receivers may comprise receivers for standard definition television and other receivers may comprise receivers for high definition television.

In preparation for broadcast, metadata 240 at the broadcast headend is preferably comprised in a data container. The metadata comprised in the data container preferably comprises "fragments" of data. The phrase "fragment of data", in all of its grammatical forms, as used in the present disclosure and claims, refers to the smallest meaningful unit of data which can be decoded independently of other units of data. Each fragment describes an entity, such as a Channel, a Program, an Instance, etc. Many fragments are collated together into broadcast containers for broadcast.

A fragment preferably comprises at least an indicator indicating which characteristics of a particular receiver the data comprised in the data container is appropriate for. For example and without limiting the generality of the foregoing, a particular data container might comprise a fragment appropriate for a receiver comprising a large cache (depicted in FIG. 2 as STB_B, STB_D, and STB_F), while a second data container might comprise a different fragment appropriate for a receiver comprising a small capacity hard drive (depicted in FIG. 2 as STB_C and STB_D). Data fragments depicted in FIG. 2 are depicted as labeled:

A, B, E;
B, D, E;
C;
C, D, F;
A, B, C, D, E; and
A, E.

Labeling data fragments in FIG. 2 as indicated above is intended to depict that data fragments comprising data for only particular receivers are "marked" with metadata reflecting which receivers correspond to the marking of the data fragments. For instance, in FIG. 2: the data fragments marked A, B, D comprises data which is appropriate for receiver STB_A, receiver STB_B, and receiver STB_D; the data fragments marked C comprises data which is only appropriate for receiver STB_C; the data fragments marked A, E comprises data which is appropriate for STB_A and STB_E; and so forth.

Figures 3, 4:
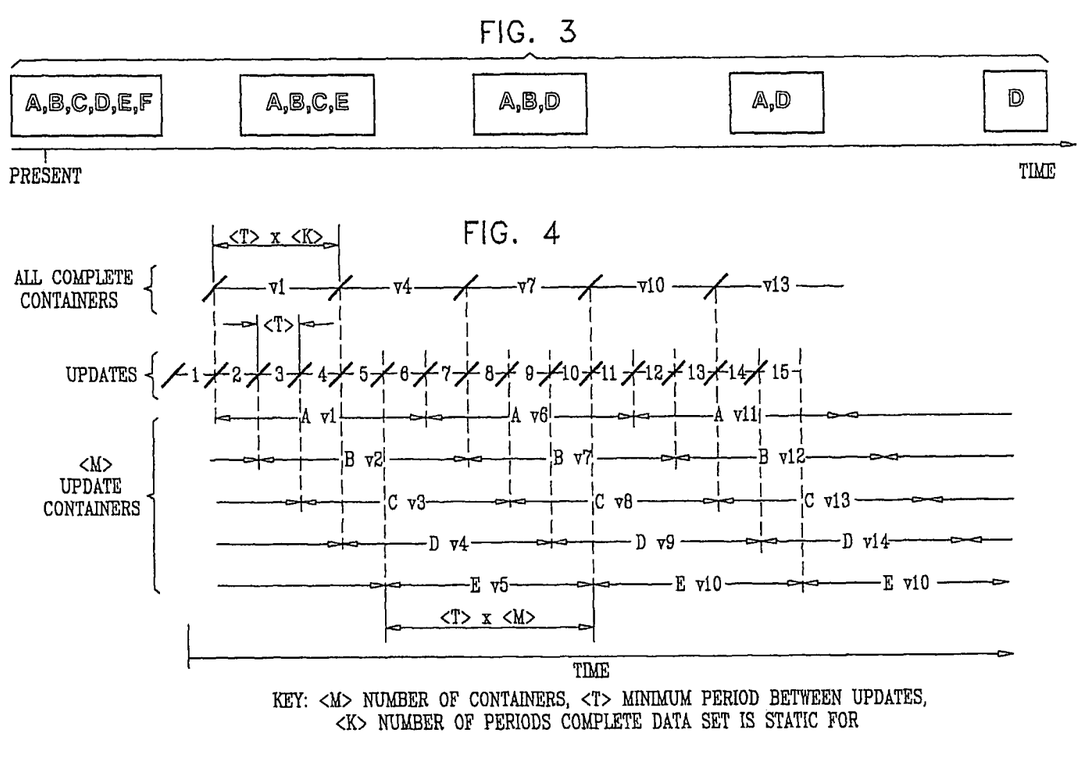
FIG. 3 is simplified timeline depicting modeled data for items closer to the present and further in the future, in accordance with the system of FIG. 1.
FIG. 4 is a simplified timeline depicting update message delivery within the system of FIG. 1.

Reference is now made to FIG. 3, which is a simplified timeline depicting modeled data for items closer to the present and further in the future, in accordance with the system of FIG. 1. In preferred embodiments of the present invention, EPG data for items further in the future are sent to fewer receivers. Thus, FIG. 3 depicts data containers plotted on a time line. A data container at or near the present time comprises data fragments appropriate for all of the different receiver types depicted in FIG. 2. As data containers are depicted further in the future on the timeline, progressively fewer receiver types are associated with each data fragments comprised in the data container.

Those skilled in the art will appreciate that those receivers comprising larger caches and larger hard drives are able to store more information. Thus, such receivers are more able to store information relevant to an event further in the future than a receiver comprising a relatively small cache and either no hard drive or a relatively small hard drive. In order that all receivers are able to tune to a given program in the present or in the very near future, program guide data for all programs in the present and in the very near future is made available to all receivers. For example and without limiting the generality of the foregoing, it is appreciated that some receivers may only be able to store enough data for the program guide to show information about programs a week in the future while other receivers may be able to store enough data for the program guide to show information about programs two weeks in the future.

In one preferred method for sorting program guide data based on time, each data fragment comprises a bit-mask, wherein each bit of the bit-mask preferably represents a period of time. To acquire data for one period, all fragments comprising the bit-mask for the relevant period set to '1' are preferably acquired. Since some television programs comprise content broadcast in more than one period, television programs are preferably grouped by combinations of periods for which they are required.

For example and without limiting the generality of the foregoing, all television programs required for a first and a second period are grouped together such that data fragments comprising program guide data associated with such programs have bits '0' and '1' set in the bit-mask. A second data fragment comprising data for television programs required for the first, the second period, and a fourth period are grouped together such that data fragments comprising program guide data associated with such programs have bits '0', '1', and '3' set. If the bit-mask comprises six bits, 64 possible combinations are possible. The following table indicates one preferred implementation of the bit-mask scheme described above.

| Bit | Meaning | Receiver Profile |
|---|---|---|
| 0 | 0 to <N> hours | Standard definition, no hard drive |
| 1 | 0 to 48 hours | Standard definition, no hard drive |
| 2 | 0 to 6 days | Standard definition, no hard drive |
| 3 | 0 to 8 days | Standard definition, no hard drive |
| 4 | 0 to 8+ days | Standard definition, no hard drive |
| 5 | 0 to 8+ days | Standard definition, with hard drive |
| 6 | 0 to 4 days | High definition enabled, no hard drive |
| 7 | 0 to 8+ days | High definition enabled, with hard drive |

N is a broadcaster configurable amount of time. It is appreciated that data fragments in which bit '5' is set will be cached primarily by high-end, standard definition only receivers that preferably persistently cache all available data.

In a typical broadcast system, all receivers will preferably cache data for the first <N> hours. Typically, such data is preferably used to provide data for a part-screen EPG display available during television viewing, as is well known in the art.

In light of the above discussions of FIGS. 2 and 3, one preferred embodiment of the present invention comprises:

data containers comprising data fragments for the program guide are broadcast on the EPG transponder, thereby preferably enabling fast access to program guide information and cache initialization data;

update messages are broadcast on all transponders, in order to keep the receiver cache up to date; and messages are broadcast with metadata identifying with which receiver or receivers any given message is associated.

Reference is now made to FIG. 4, which is a simplified timeline depicting update message delivery within the system of FIG. 1. Update messaging preferably utilizes a scheme designed to efficiently deliver data and to be resilient with regards to interruptions to message reception. Resilience with regards to interruptions to message reception impinges on data delivery, as resilience requires sending messages for a longer period, thereby increasing bit-rate required to send a message. In some preferred embodiments of the present invention, a method mixing low-latency updates with resilience is implemented.

EPG data at the broadcast headend is updated periodically. The broadcast headend preferably increments the EPG data version number when updating the EPG data. Every Nth update change is reflected in the data on the dedicated transponder for EPG data (where N is a broadcaster configurable number). The receiver preferably acquires the data containers comprising EPG updates, thereby ensuring that the receiver is up-to-date with the most recent version of EPG data available. It is appreciated that EPG data updates are preferably always available from the trickle deliveries.

All updates occurring within a time-window, hereinafter referred to as T, are delivered as updated data fragments in a first data container. The first data container is preferably broadcast for a period equal to some number, denoted M, times T. During a second time-window, hereinafter denoted $T_2$, further updated data fragments are preferably broadcast in a second data container. The second data container is also preferably broadcast for a period equal to M times T.

If there are more than M containers, a given container is preferably not reused immediately, but rather ceases to be broadcast for a period of time. It is appreciated that container version numbers periodically are preferably reused (for example and without limiting the generality of the foregoing, container version numbers may range from 0-255), thereby effectively limiting the number of containers.

Alternatively, if there are M available data containers, then the first data container is preferably available to be used again after the completion of the first data container's broadcast period. Thus, the first data container is preferably utilized to broadcast the M+1 set of data updates. The M+1 set of data updates preferably comprises an incremented version number of the EPG data. Likewise, the second data container is preferably utilized to broadcast the M+2 set of data updates, and so forth, thereby creating a cycle of update containers.

If no updates occur within time-window T, the cycle of update containers is preferably paused and preferably resumed only when an update occurs. When the cycle of update containers is paused, all M containers preferably continue to be delivered, but without an incremented version number.

As mentioned above, each of the M update containers preferably comprises an EPG version number, each update container comprising an initial version number preferably ranging from 1-M. Each update container version number therefore preferably is incremented by M at each increment. Thus, the receiver is preferably able to determine whether one update container or another update container comprises an older update. Thus, the receiver is preferably able to apply updates in a correct order, after starting to monitor for updates after caching EPG data, or, alternatively, after the receiver resumes receiving updates after a brief interruption.

It is appreciated that if monitoring is interrupted for longer than T times M, the receiver will have missed updates, and accordingly, the receiver preferably needs to reacquire all missing EPG data from the EPG transponder.

Those skilled in the art will appreciate that an entire EPG dataset comprises a version number. The broadcast headend periodically updates the EPG dataset and increments the version number. For example and without limiting the generality of the foregoing, the EPG dataset may be updated once a minute. The EPG transponder typically carries a complete EPG dataset, but does not reflect every increment in versions of the EPG dataset. For example, the EPG dataset on the EPG transponder may change every 5 minutes and thereby deliver version 0, then version 4, and then version 9, and so forth. The reason for not incrementing the EPG dataset on the EPG transponder frequently is to provide a more stable set of EPG data from which it is easier for the receiver to initialize caching. The update stream carries update messages. A set of update messages is delivered for every increment in version number. Each set of updates is preferably delivered for a period of time which is greater than the period over which the broadcast headend applies updates. The receiver preferably stores the version number of the EPG data which the receiver has cached. The receiver preferably uses the update stream to incrementally apply updates of the EPG data, until the cached data version stored on the receiver is preferably the same as the version of the EPG dataset at the headend.

Version numbers of data broadcast on the EPG transponder update containers, and EPG data comprised at the broadcast headend preferably all comprise the same version number. Thus, the same information, whether comprised in an update container or broadcast on the EPG transponder preferably comprises the same version number. A new set of EPG data is preferably broadcast for delivery and preferably acquired by receivers before the update containers complete a cycle period of T times M. Updates to a complete set of EPG data preferably occur with a period of K times T, where K is an integer less than M.

A complete set of EPG data is preferably acquired by the receiver from broadcast data in less than the time period T times M. If a new set of program data is not delivered and acquired, then the receiver will miss needed updates.

Figure 5:
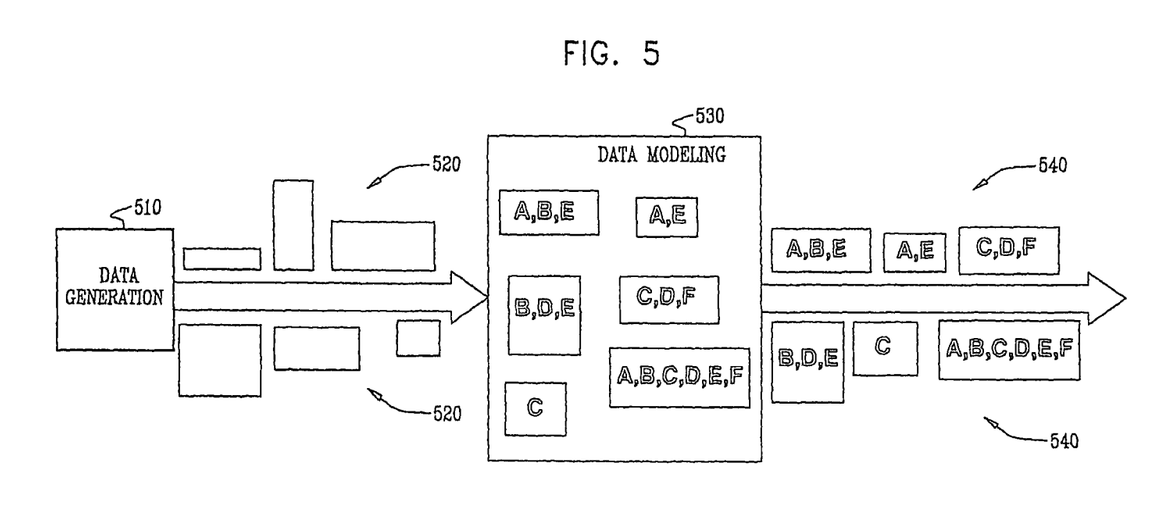
FIG. 5 is a simplified block diagram illustration of data generation and data modeling at the broadcast headend within the system of FIG. 1.
Figure 6:
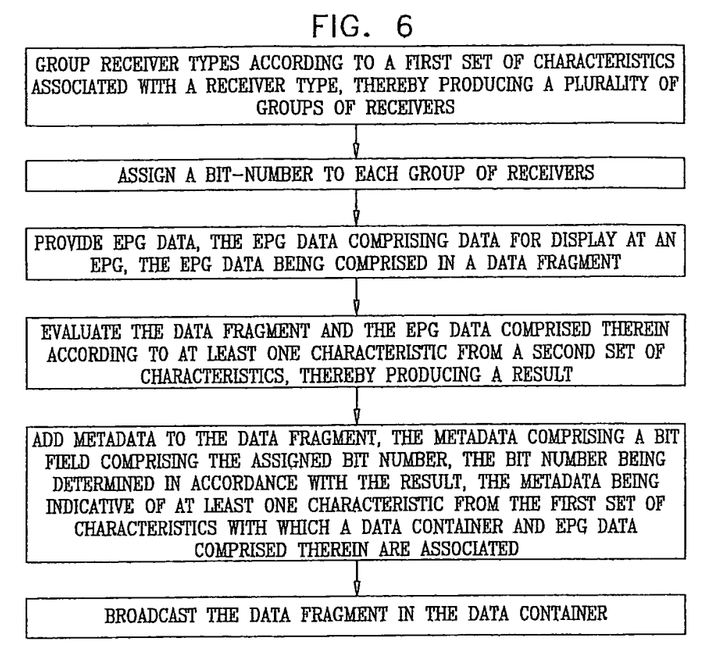
FIGS. 6-9 are simplified flowchart illustrations of preferred methods of operation of the system of FIG. 1, in accordance with preferred embodiments thereof.
Figure 7:
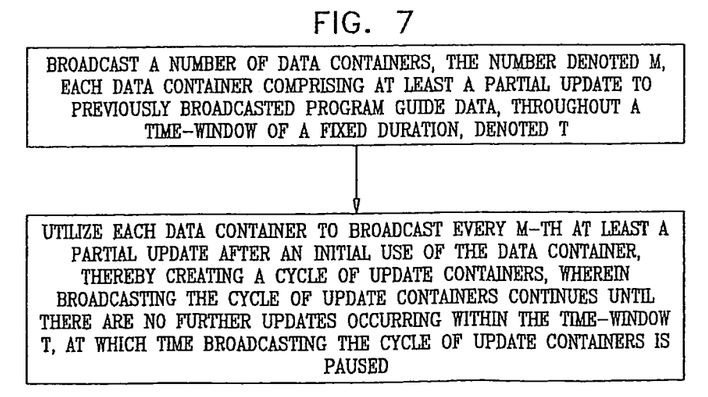
Figure 8:
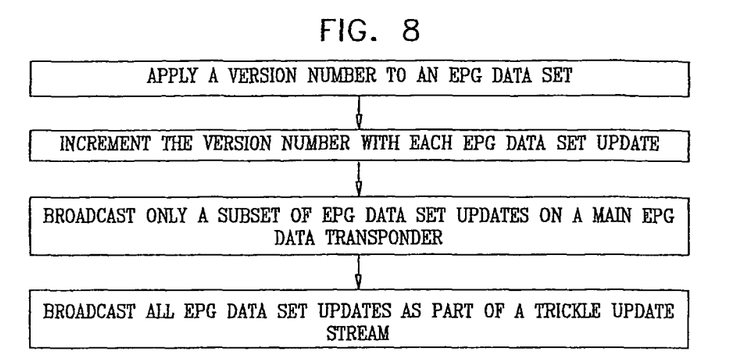
Figure 9:
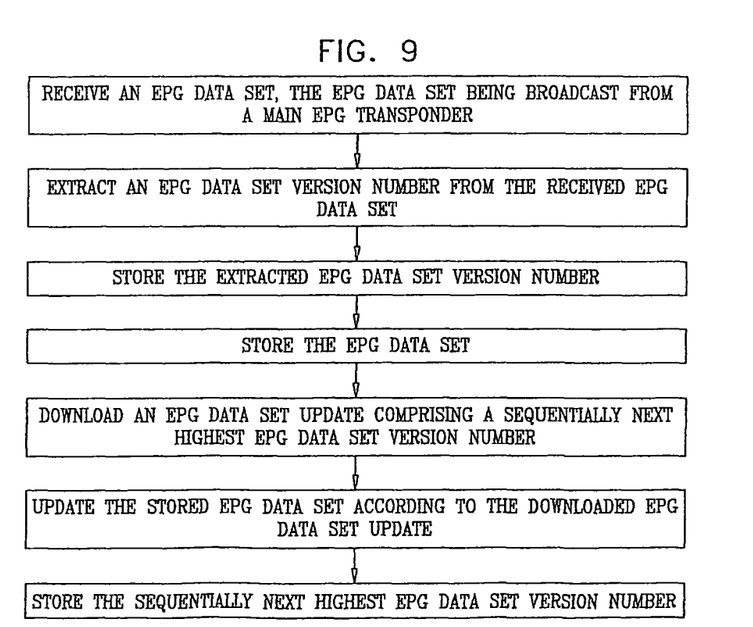

Reference is now made to FIG. 5, which is a simplified block diagram illustration of data generation and data modeling at the broadcast headend within the system of FIG. 1. FIG. 5 depicts a highly conceptualized scheme of data modeling. EPG data is generated for eventual delivery to receivers at a data generation unit 510 comprised in the broadcast headend. Those skilled in the art will appreciate that in practice the data generation unit 510 may comprise several distinct pieces of hardware, software, or combinations thereof. Nevertheless, for ease of depiction, the data generation unit 510 is depicted as a single unit.

EPG data 520 generated at the data generation unit 510 is preferably input into a data modeling unit 530. Data comprising metadata indicating with which receiver types the EPG data 520 is associated is added to the EPG data 520 by the data modeling unit 530. The labeled EPG data 540 is preferably output by the data modeling unit 530 for further processing at the broadcast headend and for broadcast, as is well known in the art.

Reference is now made to FIGS. 6-9, which are simplified flowchart illustrations of preferred methods of operation of the system of FIG. 1, in accordance with preferred embodiments thereof FIGS. 6-9 are believed to be self explanatory with reference to the above discussion.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A data update method for program guide data, the method comprising:

throughout a time-window of a fixed duration, the time-window denoted T, concurrently broadcasting a plurality of data containers, the plurality of data containers comprising M data containers, each data container comprising an update to program guide data and a version number associated with the update, the update comprising one of a partial update and a complete update to previously broadcasted program guide data; and during one or more subsequent time-windows of the fixed duration, utilizing each data container to broadcast another $M^{th}$ update after an initial use of the data container, thereby creating a cycle of update containers, where each data container broadcast during said one or more subsequent time-windows includes a version number which is incremented relative to a version number of a preceding broadcast of that data container; and wherein broadcasting the cycle of update containers continues until there are no further updates occurring within a given time-window of the one or more subsequent time-windows, at which time broadcasting the cycle of update containers is paused, but the data containers continue to be broadcast, each of the data containers which continues to be broadcast comprising a previous update to program guide data and the version number associated with said previous update.

2. The method according to claim 1 and wherein the version number associated with each said update comprises a version number of an EPG dataset.

3. The method according to claim 1 and wherein the number of data containers, M, comprises a fixed number of data containers.

4. The method according to claim 1 and wherein the number of data containers, M, comprises a variable number of data containers.

5. The method according to claim 4 and wherein a plurality of data containers comprise a complete update to previously broadcasted program guide data.

6. The method according to claim 1 and wherein receivers receiving the data containers sequentially apply the at least partial updates comprised in the data containers.

7. A data update system for program guide data, the system comprising:

a broadcast headend for concurrently broadcasting throughout a time-window of a fixed duration, the time-window denoted T, a plurality of data containers, the plurality of data containers comprising M data containers, each data container comprising an update to program guide data and a version number associated with the update, the update comprising one of a partial update and a complete update to previously broadcasted program guide data, and the broadcast headend utilizing each data container, during one or more subsequent time-windows of the fixed duration, to broadcast another $M^{th}$ update after an initial use of each data container, thereby creating a cycle of update containers, where each data container broadcast during said one or more subsequent time-windows includes a version number which is incremented relative to a version number of a preceding broadcast of that data container; and wherein broadcasting the cycle of update containers continues until there are no further updates occurring within a given time-window of the one or more subsequent time-windows, at which time the broadcasting of the cycle of updates is paused, but the data containers continue to be broadcast, each of the data containers which continues to be broadcast comprising a previous update to program guide data and the version number associated with said previous update.

8. The system according to claim 7 and wherein the version number associated with each said update comprises a version number of an EPG dataset.

9. The system according to claim 7 and wherein the number of data containers, M, comprises a fixed number of data containers.

10. The system according to claim 7 and wherein the number of data containers, M, comprises a variable number of data containers.

11. The system according to claim 10 and wherein a plurality of data containers comprise a complete update to previously broadcasted program guide data.

12. The system according to claim 7 and wherein receivers receiving the data containers are operative to sequentially apply the at least partial updates comprised in the data containers.

* * * * *